(12) United States Patent
Jones

(10) Patent No.: US 11,204,264 B2
(45) Date of Patent: Dec. 21, 2021

(54) INDUCTIVE SENSOR ARRANGEMENT

(71) Applicant: Sagentia Limited, Cambridge (GB)

(72) Inventor: Ross Jones, Cambridge (GB)

(73) Assignee: Sagentia Limited, Cambridge (GB)

(*) Notice: Subject to any disclaimer, the term of this patent is extended or adjusted under 35 U.S.C. 154(b) by 356 days.

(21) Appl. No.: 16/335,495

(22) PCT Filed: Sep. 7, 2017

(86) PCT No.: PCT/EP2017/072509
§ 371 (c)(1),
(2) Date: Mar. 21, 2019

(87) PCT Pub. No.: WO2018/054696
PCT Pub. Date: Mar. 29, 2018

(65) Prior Publication Data
US 2020/0018623 A1  Jan. 16, 2020

(30) Foreign Application Priority Data

Sep. 22, 2016 (EP) .................................... 16190083

(51) Int. Cl.
*G01D 5/20* (2006.01)
*G01B 3/20* (2006.01)
*G01D 5/244* (2006.01)

(52) U.S. Cl.
CPC ........... *G01D 5/2073* (2013.01); *G01B 3/205* (2013.01); *G01D 5/24438* (2013.01)

(58) Field of Classification Search
CPC ... G01D 5/2073; G01D 5/205; G01D 5/24438
See application file for complete search history.

(56) References Cited

U.S. PATENT DOCUMENTS 5,804,963 A * 9/1998 Meyer .................... G01D 5/202
324/207.17
5,998,990 A  12/1999 Andermo
(Continued)

FOREIGN PATENT DOCUMENTS

CN  101144725 A  3/2008
CN  104880141 A  9/2015
(Continued)

OTHER PUBLICATIONS

International Search Report dated Nov. 9, 2017, for International Application No. PCT/EP2017/072509 (12 pages).
(Continued)

*Primary Examiner* — Walter L Lindsay, Jr.
*Assistant Examiner* — Milton Gonzalez
(74) *Attorney, Agent, or Firm* — Fitch, Even, Tabin & Flannery LLP

(57) ABSTRACT

An inductive sensor device has a scale with scale elements that provide a field pattern in at least one line extending in a measuring direction. The inductive sensor device contains at least one receive circuit with at least one receive coil. The receive coil and the scale are moveable relative to each other in the measuring direction. The receive coil extends from a first end to a second end in the measuring direction. It has a first end section directly adjacent to the first end and a second end section directly adjacent to the second end, and middle section. Each of the sections contains at least one loop of the receive coil. In the end sections the loop area decreases from loop to loop from the loop next to the middle section toward the respective end. Such a loop design compensates for misalignments between the receive coil and the scale.

25 Claims, 9 Drawing Sheets

(56) References Cited

U.S. PATENT DOCUMENTS

| | | | |
|---|---|---|---|
| 6,011,389 A | 1/2000 | Masreliez et al. | |
| 6,335,618 B1 * | 1/2002 | Nahum | G01B 3/205 |
| | | | 324/207.17 |
| 7,239,130 B1 | 7/2007 | Milvich | |
| 7,652,469 B2 | 1/2010 | Meyer | |
| 9,267,819 B2 | 2/2016 | Cook | |
| 9,417,094 B2 | 8/2016 | Cook et al. | |
| 9,933,283 B2 | 4/2018 | Lewerentz | |
| 10,330,496 B2 | 6/2019 | Frese | |
| 10,458,815 B2 | 10/2019 | Leidich et al. | |
| 2010/0277161 A1 | 11/2010 | Steinke et al. | |
| 2011/0254541 A1 | 1/2011 | Sasaki | |

FOREIGN PATENT DOCUMENTS

| | | |
|---|---|---|
| CN | 105300260 A | 2/2016 |
| CN | 105393090 A | 3/2016 |
| DE | 102013224098 A1 | 5/2015 |
| DE | 102014220446 A1 | 4/2016 |
| JP | 2005077150 A | 3/2005 |

OTHER PUBLICATIONS

European Search Report and Search Opinion dated Mar. 17, 2017, for European Application No. 16190083.2 (7 pages).
Chinese Office Action and Search Report dated Nov. 30, 2020, in corresponding Chinese Application No. 201780058472.4, with English translation (14 pages).

\* cited by examiner a)

b)

c)

d)

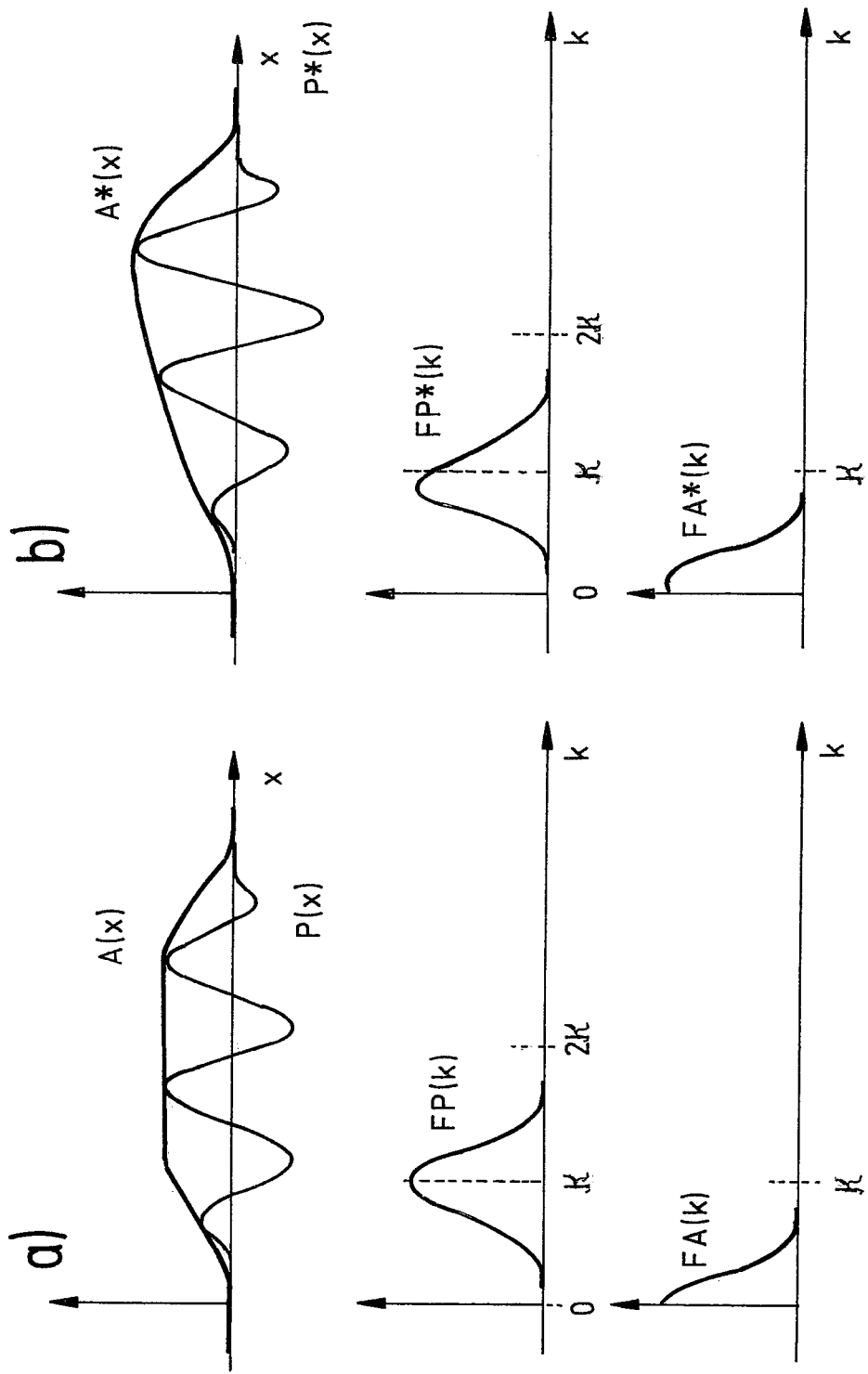

INDUCTIVE SENSOR ARRANGEMENT

CROSS REFERENCE TO RELATED APPLICATIONS

This patent application is the national phase of PCT/EP2017/072509, filed Sep. 7, 2017, which claims the benefit of European Patent Application No. 16190083.2, filed Sep. 22, 2016.

TECHNICAL FIELD

The present invention refers to the field of inductive sensor devices. Such inductive sensor devices can be used for determination of a relative position between two parts that are moveable relative to each other in a linear and/or circular direction. Such inductive sensor devices can be used for measuring instruments like calipers, micrometer gauges, test indicators, touch probes and other measuring instruments.

BACKGROUND

An inductive sensor device is for example disclosed in US 2011/0254541 A1. A scale is provided with a number of scale coils arranged along measuring direction in regular distances (scale pitch). A sensor unit containing a transmit coil and a receive coil is provided and is able to move in a measuring direction along the scale. The magnetic field created by the transmit coil is modified by means of the scale coils. Depending on the relative position between the sensor unit and the scale a field pattern is thus created that is detectable by means of the receive coil. An output signal provided by the receive coil can thus be used for determination of the relative position between the sensor unit and the scale. It is proposed to use a plurality of receive coils that are displaced in measuring direction by an odd multiple of half the scale pitch. These receive coils are electrically connected and the output difference is used for position determination. In so doing an offset of the two output signals of the receive coils can be eliminated by using the signal difference.

U.S. Pat. No. 7,239,130 B1 shows an inductive sensor device that aims to eliminate an error due to tilting of the sensor unit with regard to the scale in the measuring direction. A plurality of receive coils are provided that are displaced by one half of the scale pitch in measuring direction. The loop areas of the offset receive coils overlap in at least one zone. In at least one of these zones the displaced receive coils are connected in series. This requires a modified shape of at least one of the loops. As a consequence, a phase error is created. If a plurality of groups of such series connected receive coils is provided, the phase error of each group will be identical so that a proper phase relationship between the groups is achieved.

These prior art receive coil designs are complex and thus costly. Accordingly, one object of the present invention is to provide an inductive sensor arrangement that allows a simple reduction or elimination of a tilting error between a sensor unit and a scale in measuring direction.

SUMMARY

This object is solved by means of an inductive sensor device as described blow.

The inductive sensor device comprises a scale having a plurality of scale elements that is adapted to create a field pattern in at least one line and extending in a measuring direction.

Preferably a transmit circuit with at least one transmit coil is provided. The transmit circuit is adapted to create a magnetic field by means of the at least one transmit coil. Preferably the transmit circuit contains only one transmit coil. In such embodiments the scale elements can contain electric conducting material and are preferably formed by at least one scale loop respectively. The scale elements can be arranged distant to each other at a constant scale pitch in measuring direction in a respective line. If more than one line of scale elements is provided, the scale pitch of each line can be different. The scale elements are used as passive field influencing elements in order to modify or vary the magnetic field of the transmit coil for creating the field pattern.

For each line of a field pattern or scale elements one sensor unit is provided. The sensor unit and the scale are moveable relative to each other in measuring direction. The sensor unit contains a receive circuit and can also contain the transmit circuit for each line. The receive circuit comprises at least one receive coil adapted to detect the field pattern depending on the relative position between the sensor unit and the scale. The receive circuit is adapted to provide a receive signal characterizing the magnetic flux through the loops of the at least one receive coil.

Each of the at least one receive coils contains loops that are arranged adjacent to each other in measuring direction, wherein each loop encloses a respective loop area. The at least one receive coil extends in measuring direction between a first end and a second end. Directly adjacent to the first end a first end section of the receive coil is provided. A second end section is provided directly adjacent to the second end. A middle section of the at least one receive coil connects the two end sections. Each of these sections contains at least one loop of the receive coil.

The amount of each loop area of the at least one loop arranged in one of the end sections is smaller than the amount of each loop area of the at least one loop arranged in the middle section. As a consequence, the different amounts of the loop areas in the end sections compared with the middle section provide different contributions to the receive signal used for position determination. The ratio of the amounts of a loop area in one of the end sections compared with a loop area of a loop in the middle section can be determined such that a misalignment between the sensor unit and the scale in measuring direction can be compensated at least partly. For example a linear tilt, a bend or other misalignments that lead to offsets in the signal of the receive circuit can thus be considered in the design of the inductive sensor device and the influence of a misalignment between the sensor unit and the scale for the position determination can be reduced or eliminated.

The different amount of a loop area in one of the end sections compared with an amount of a loop in the middle section is a design parameter of the at least one receive coil that can be adapted to compensate for misalignment, e.g. for linear tilting in measuring direction. The contribution of the loops in the end section to the induced voltage in the receive coil can be determined in a way that reduces or eliminates any signal offset due to misalignment of the sensor unit and the scale in measuring direction.

The shape of the at least one receive coil can be defined as follows: A peak coupling of each loop of the at least one receive coil to the scale is given by numbers ki (k1, k2, k3, . . . ), wherein in the absence of tilts, these peak couplings are all equal, say equal to 1. To compensate tilt a weighting factor ei (e1, e2, e3, . . . ) can be applied to each loop representing its loop area amount. That is the weighting factor of two loops are equal if their loop area amounts are equal. The weighting factor is preferably proportional to the respective loop area amount. To compensate tilt, the loop area amounts are defined in order that the total coupling of the magnetic field pattern and the receive coil has equal amounts at a first relative position with minimum (negative) total coupling and a second relative position with maximum (positive) total coupling. Between the first and second position the at least one receive coil and the scale are shifted preferably by half a pitch of the field pattern.

The invention can be used in inductive sensor devices that have a long line of passive field influencing scale elements extending along the whole measuring range in measuring direction. In such a design the transmit coil and the at least one receive coil of the sensor unit can be shorter than the length of the line of scale elements.

In another design of the inductive sensor device the line of field influencing scale elements is shorter in measuring direction than the dimension of the transmit coil and/or the at least one receive coil, so that the scale elements can move along the coils in measuring direction. In such a design the scale elements are arranged inside a scale envelope with tapered end sections at opposite sides in measuring direction. The at least one receive coil may have a conventional design in this embodiment where all the coil loops have the same loop area amount.

Preferably the scale elements are formed by separate scale coils that are electrically separated from each other. Each scale coil consists preferably of one single scale loop.

Another embodiment of the inductive sensor device uses a scale with long coil extending in measuring direction, wherein the loops of this long coil form field elements and are adapted to create a field pattern along the at least one line in measuring direction. A shorter receive coil is part of the sensor unit.

In one preferred embodiment the at least one receive coil has at least two loops in each of the end sections. The amount of the loop area in the first end section decreases from loop to loop toward the first end. Similarly in the second end section the amount of the loop area decreases from loop to loop toward the second end.

It is advantageous when all of the loops arranged in the middle section have equal loop area amounts. The loops arranged in the middle section can have identical shapes.

The at least one receive coil has a coil length in measuring direction between the first end and the second end. The at least one receive coil has a coil height in a height direction perpendicular to the measuring direction. The coil height can increase in the first end section from the first end toward the middle section. The coil height can decrease in the second end section from the middle section toward the second end. An envelope surrounding the at least one receive coil can be used to define the coil length and the coil height. The envelope provides a surrounding line around the loops of the receive coil. For example such an envelope touches each of the loops externally.

The envelope can be defined so that the height of the receive increases from the two ends toward the middle of the receive coil, so that the envelope is smoothly tapered at both opposite end sections. The envelope shapes the coupling function that characterizes the dependence of the coupling between the transmit and receive coil on the position in the measuring direction. The envelope is preferably defined in a way that the Fourier Transform of the coupling function and at least one of its derivatives are zero at the zero wavenumber.

In one preferred embodiment the receive circuit contains at least two receive coils. The first ends of these two receive coils are offset in measuring direction and/or the second ends of the two receive coils are offset in measuring direction. Accordingly the at least two receive coils can have different coil lengths and/or different envelopes. Preferably both receive coils are arranged symmetrically with regard to a common height axis extending in the height direction perpendicular to the measuring direction.

It is further advantageous when each loop of the at least one receive coil has a symmetrical shape or contour with regard to a longitudinal axis extending in measuring direction.

It is further preferred when all of the loops of the at least one receive coil have the same loop dimension at a longitudinal axis extending in measuring direction. This dimension of each of the loops at the longitudinal axis corresponds to a loop pitch or half of a loop wavelength of the at least one receive coil.

Preferably the end section length of the end sections and/or the middle section lengths of the middle section in measuring direction corresponds to an integer multiple of the loop pitch or loop wavelength of the receive coil.

In one further preferred embodiment the at least one receive coil is defined by a first conductor and a second conductor providing a sinusoidal shape to each of the loops on one side of a longitudinal axis of the receive coil and a mirrored shape on the opposite side of the longitudinal axis, wherein the longitudinal axis extends in measuring direction. In one embodiment a portion of the first conductor and a portion of the second conductor are alternately arranged in different layers of a circuit board so as to form loops that have the sinusoidal shape on the one side and, at the opposite side of the longitudinal axis, the shape obtained by mirroring the sinusoidal shape to the respective opposite side of the longitudinal axis.

Preferably the apex of each half wave of each of the conductors is in touch with the envelope that defines the outer contour of the at least one receive coil.

It is also preferable when the first conductor and the second conductor are arranged in different layers of a circuit board of the sensor unit. The first conductor and the second conductor can be connected or short-circuited together at one of the first end or the second end of the receive coil. At the respective other end the receive signal provided by the receive coil is provided between two terminals of the receive coil.

In one embodiment the number of loops is equal in both end sections. Moreover, each of the loops arranged in the first end section has preferably a counter part arranged in the second end section having the same amount of the loop area and/or the same shape. This can be achieved for example by making the at least one receive coil mirror symmetric to a height axis extending in a height direction perpendicular to the measuring direction.

Each amount of a loop area of one loop provided in the first end section or the second end section respectively is preferably determined depending on a tilt weighting function having at least one tilting coefficient. The tilting coefficient is different to zero. The tilt weighting function describes a tilt and/or another misalignment like bending or the like between the sensor unit and the scale in measuring direction.

The tilt weighting function can be described in the form of a Taylor series. To simplify the tilt weighting function, the even powers of the function variable (that corresponds to a coordinate value in the measuring direction) can be omitted. Accordingly, only tilting coefficients with regard to uneven powers of the function variable are considered and contained. In one embodiment only one tilting coefficient is provided in the tilt weighting function that describes a linear tilt in measuring direction.

The different loop area amounts in a common end section each define a parameter that can be varied when designing the at least one receive coil. This number of loops having different amounts in the first end section or the second end section corresponds at least to the number of tilting coefficients different to zero contained in the tilt weighting function.

BRIEF DESCRIPTION OF THE DRAWINGS

Preferable embodiments of the present invention are disclosed in the dependent claims, the specification and the drawings. In the following preferred embodiments of the invention are explained in more detail referring to the attached drawings. In the drawings:

DETAILED DESCRIPTION

Figure 1:
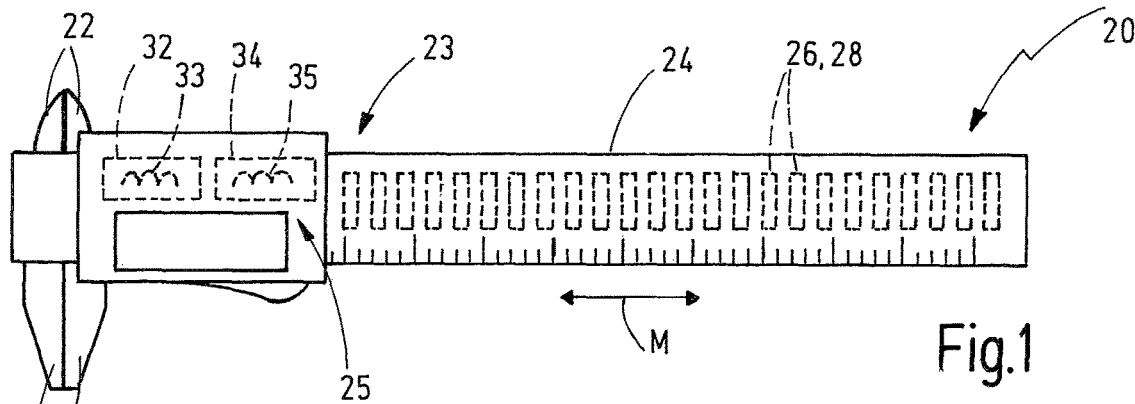
FIG. 1 shows a schematic top view of a measuring instrument that can be equipped with an inductive sensor device.

FIG. 1 shows a schematic illustration of an exemplary measuring instrument 20 in form of a caliper. The caliper is realized as digital caliper for measuring a distance between inside jaws 21 and/or outside jaws 22 of an object. The distance is measured by means of an inductive sensor device 23. The inductive sensor device 23 includes a scale 24 and a sensor unit 25 that are moveable relative to each other in a measuring direction M. The scale 24 contains a number of scale elements 26 that are arranged in at least one line 27 extending in a measuring direction M and adapted to create a field pattern S(x) in measuring direction M.

In the preferred embodiment the scale elements contain electrically conductive material. The scale elements 26 are electrically not connected with each other, but are separate non-connected elements. In the present example each scale element 26 is formed by a scale loop and preferably by one single scale loop 28. The scale elements are passive field influencing elements and create the field pattern by varying or modifying a magnetic field B.

According to preferred embodiments the inductive sensor device 23 and preferably the sensor unit 25 contains a transmit circuit 32 having at least one transmit coil 33 for creating the magnetic field B and at least one receive circuit 34. Each receive circuit contains at least one receive coil 35. Preferably for each line 27 of scale elements 26 a respective transmit coil 33 and a respective receive circuit 34 is provided. The lines 27 and the respective transmit coils 33 and receive circuits 34 can be arranged adjacent to each other in a height direction H perpendicular to the measurement direction M. The height direction H and the measurement direction M form a plane, in which the scale loops 28 extend.

Figure 2:
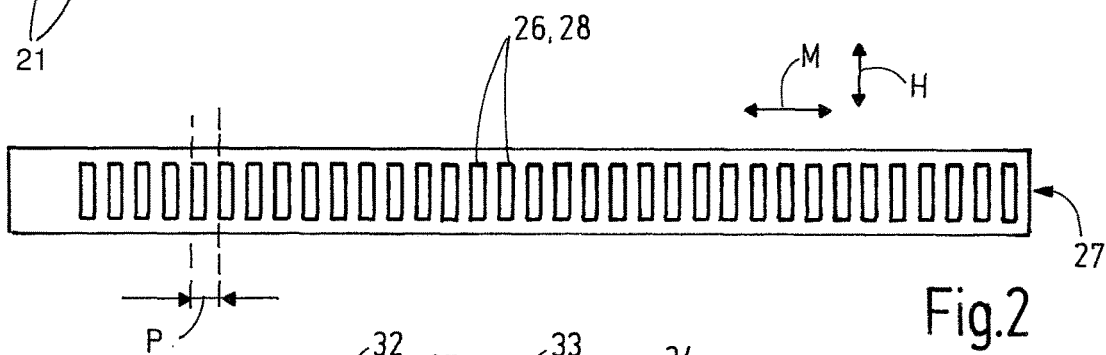
FIG. 2 shows a schematic top view of one embodiment of a scale containing scale elements.

As shown in FIG. 2, directly adjacent scale loops 28 are arranged in a regular pattern in measuring direction M defining a scale pitch p or a scale wavelength. The scale pitch p corresponds to the sum of the dimension of one scale loop 28 and the gap between two directly adjacent scale loops 28 in measuring direction M.

Figure 3:
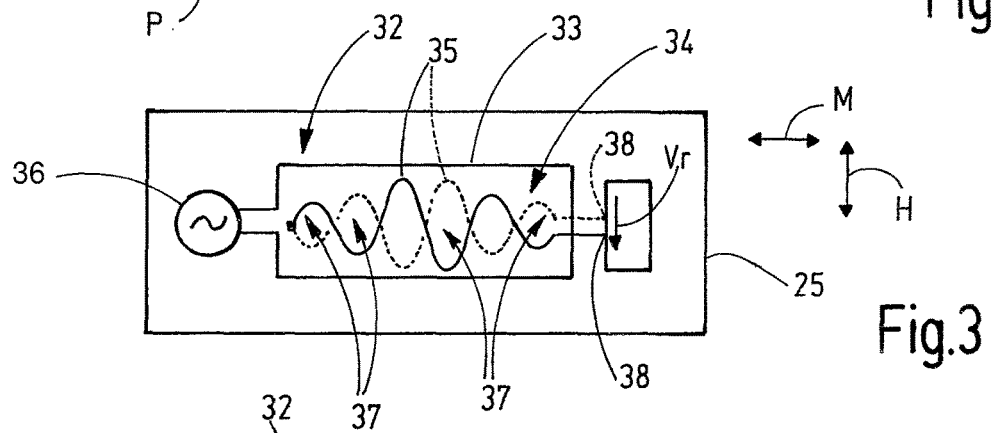
FIG. 3 is a schematic illustration of an embodiment of a sensor unit containing a transmit circuit and a receive circuit.

The transmit coil 33 of a transmit circuit 32 extends in a plane defined by the measurement direction M and the height direction H. In this plane the transmit coil 33 surrounds the at least one receive coil 35 as schematically illustrated in FIG. 3. The transmit coil 33 can have a rectangular contour or may have any different shape that might be adapted to the outer contour or envelope E of the at least one receive coil 35. The shape and design of the at least one receive coil 35 will be explained in detail below.

An AC voltage source 36 is connected or connectable to the transmit coil 33. Due to the alternating current, the magnetic field B (FIG. 4) is created. The magnetic field B has circular field lines around the preferably single loop of the transmit coil 33. The direction of the field lines depend on the direction of the current through the transmit coil 33.

The magnetic field B creates a magnetic flux through the loops 37 of the at least one receive coil 35. Accordingly, a receive voltage Vr is induced between terminals 38 of the receive coil 35. This receive voltage Vr forms a receive signal that depends on the relative position between the receive coil 35 and the scale 24. Accordingly, the receive voltage Vr changes as the sensor unit 25 moves in measuring direction M along the scale 24. This receive signal can be used in the receive circuit 34 to determine the actual relative position between the sensor unit 25 and the scale 24. Depending on the design of inductive sensor device 23, either a relative or an absolute position determination is possible.

Figure 4:
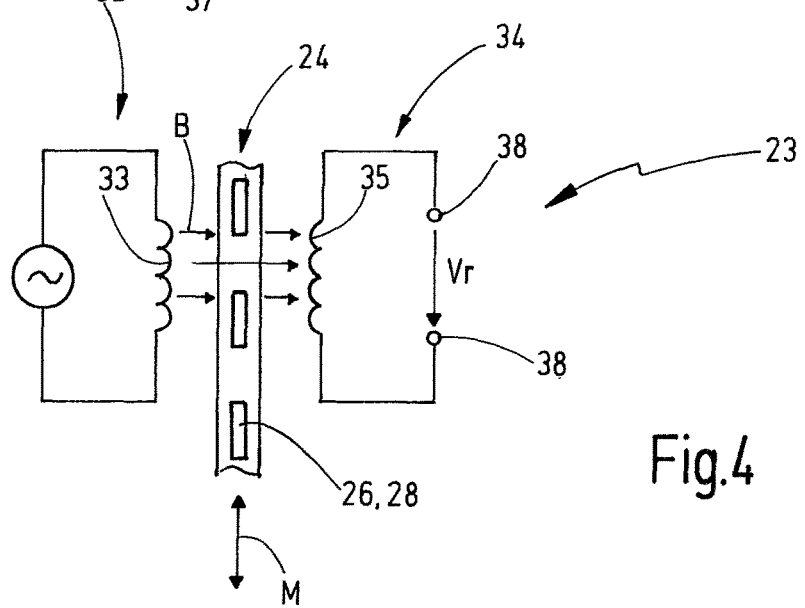
FIG. 4 is a diagram schematically illustrating the function principle of an inductive sensor device, FIGS. 5a and 5b each show a schematic perspective illustration of an exemplary receive coil containing conductors provided in different layers of a circuit board.

This basic operating principle is illustrated in FIG. 4. The magnetic field B created by the transmit coil 33 couples with the receive coil 35, wherein the coupling depends on the position of the scale elements 26 in the magnetic field B, that affect the coupling. In the absence of the scale 24, there is virtually no coupling between the transmit coil 33 and receive coil 35. Otherwise, this coupling would be another source of offset. This is for example achieved by having zero net area in the receive coil 35 (taking orientation into account), or by making the receive coil 35 antisymmetric with respect to the transmit coil 33.

Different to the shown embodiment of the inductive sensor device 23, it is not necessary that the length of the line 27 of scale elements 26 is longer than the length of the transmit coil 33 and/or the at least one receive coil 35. It is for example also possible that the transmit coil 33 is provided at the member having a longer extension in measuring direction M and that a member that moves along the measuring direction M contains a number of field influencing scale elements 26. The key feature is that a field pattern S(x) is created along which the at least one receive coil 35 moves and detects the field pattern S(x) for position determination.

Figure 5A:
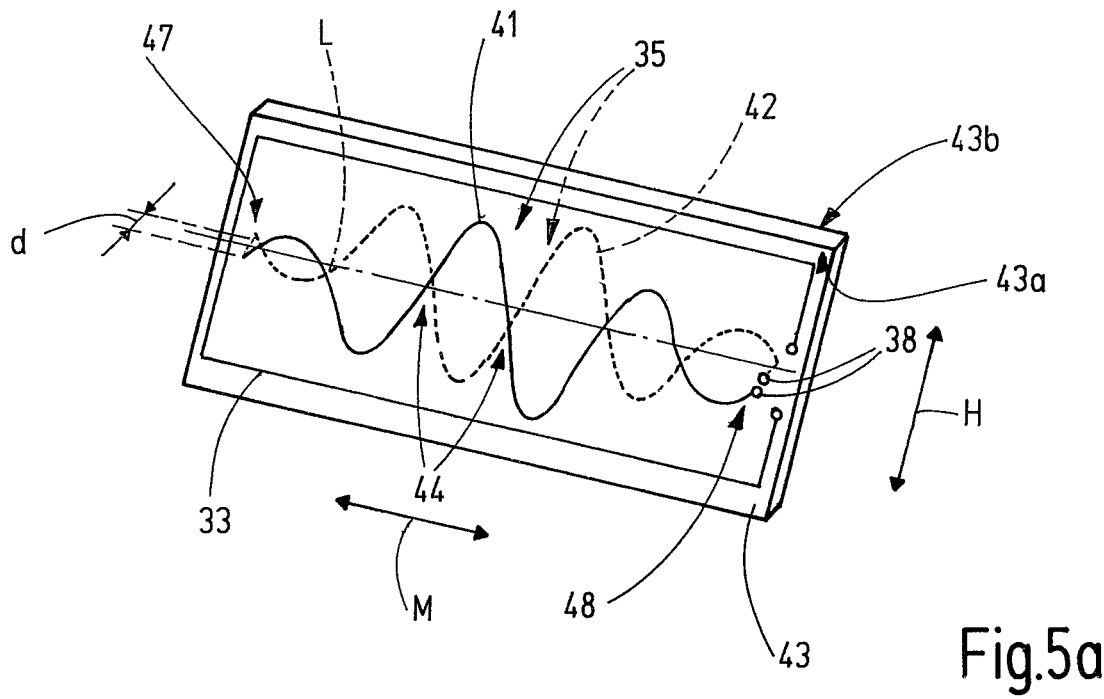

As illustrated in FIG. 5a, the at least one receive coil 35 can be formed by a first conductor 41 and a second conductor 42 that are provided on different layers 43a and 43b of a circuit board 43. Each of the conductors 41, 42 has an alternating run with regard to a longitudinal axis L that extends in measuring direction M. The conductors cross each other at crossing locations 44 that are arranged on the longitudinal axis L with view in a direction perpendicular to the measurement direction M and to the height direction H, which means perpendicular to the plane in which the circuit board 43 extends. In this viewing direction the two conductors 41, 42 create loops 37 of the receive coil 35, that are arranged directly next to each other in measuring direction M. Between two directly adjacent crossing locations 44 one loop 37 is present. It is noted that the conductors run in different layers and are not electrically connected at these crossing locations 44. The distance between two directly adjacent crossing locations 44 in measuring direction M corresponds to a half wavelength w of the receive coil 35 (compare FIG. 9).

Figure 5B:
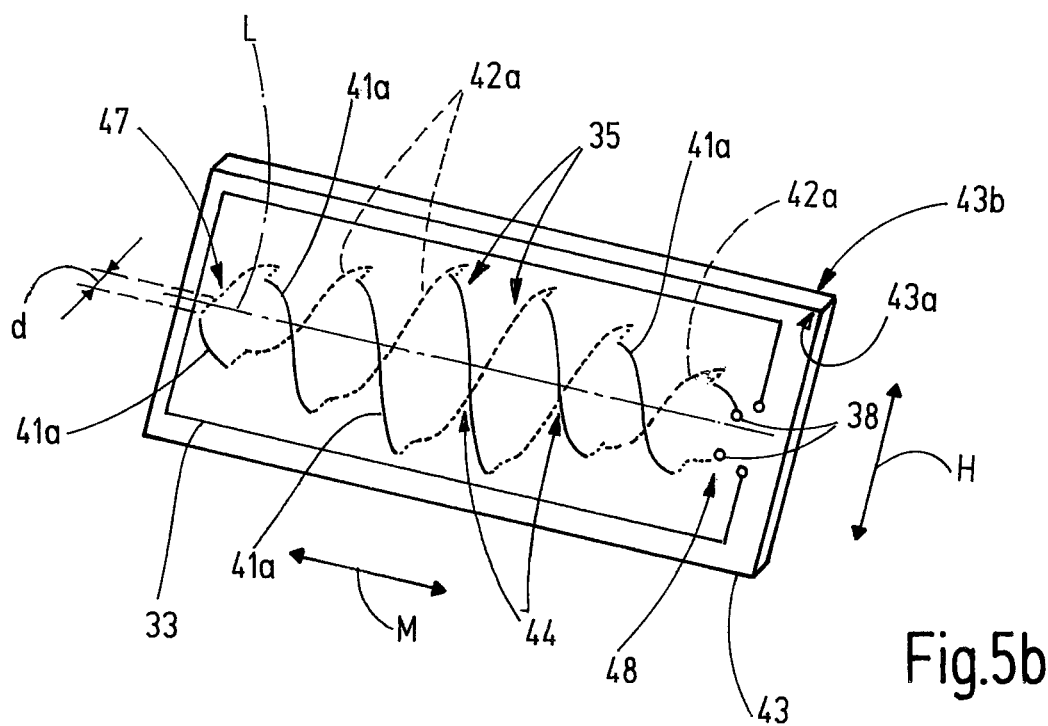

In FIG. 5a each of the conductors 41 and 42 have a continuous run between the first end 47 and the second end 48 in one of the layers 43a and 43b. Different to that FIG. 5b schematically illustrates an alternative embodiment. The first conductor 41 provided in the first layer 43a is separated into first conductor portions 41a. Two first conductor portions 41a directly adjacent to each other in measuring direction M are electrically connected by one second conductor portion 42a of the second conductor 42 provided in the other layer 43b of the circuit board. In this embodiment the number of vias that are necessary to create the receive coil is higher than in the example of FIG. 5. The advantage of this design is that two or more receive coils 35 can be interleaved, enabling a radiometric measurement to determine position. The basic shape of the loops 37 and the receive coil 35 corresponds to the example of FIG. 5a. Each loop 37 is substantially symmetric with regard to the longitudinal axis L. At one side of the longitudinal axis the coil loop 37 has a sinusoidal contour, created by the run of the respective portion 41a, 42a of at least one conductor 41, 42. At the other side of the longitudinal axis L the contour of the coil loop 37 is mirror symmetric. In other words, each coil loop 37 is created by a positive half wave and a mirror symmetric negative half wave of a sinusoidal run of the respective portion 41a, 42a of at least one conductor 41, 42 on the respective sides of the longitudinal axis L.

As schematically shown in FIGS. 5a and 5b, the two conductors 41, 42 or their respective conductor portions 41a, 42a are displaced by a distance d that corresponds to the distance of the layers 43a and 43b of the circuit board 43. However, this distance d is small compared with the dimensions of the receive coil 35 in height direction H and measurement direction M. The illustration in FIG. 5 is not to the scale and only schematic.

On this circuit board 43 the transmit coil 33 may be provided either in a further, separate layer or in one of the layers 43a, 43b in which a respective conductor 41 or 42 or a respective conductor portion 41a or 42a is arranged.

The wavelength w is preferably equal to the pitch p of the scale loops 28, which leads to larger amplitudes of the receive voltage Vr.

Figure 6:
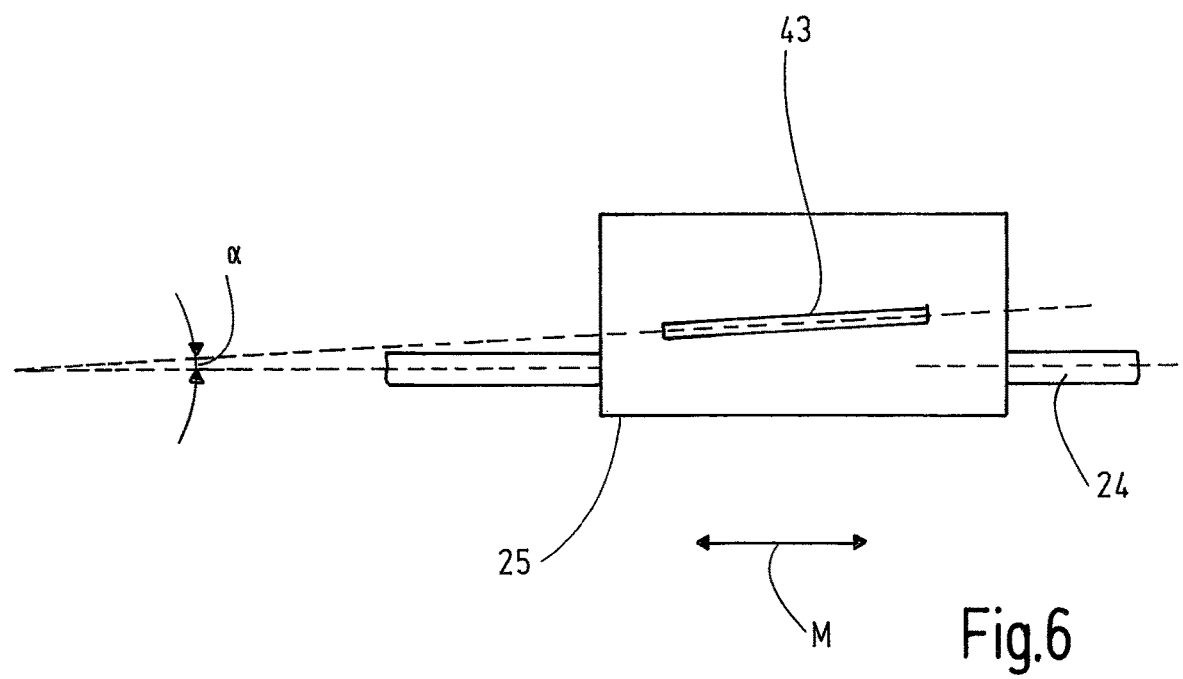
FIG. 6 is a schematic illustration showing a tilt between the transmit circuit and/or the receive circuit of the sensor unit with regard to the scale in a measuring direction.

FIG. 6 illustrates schematically that a misalignment and e.g. a tilt can occur between the orientation of at least two of the scale elements 26, the transmit coil 33 and the receive coil 35. In the present embodiment the receive coil 35 and the transmit coil 33 are both contained in the sensor unit 25 and a tilt or misalignment can occur between the circuit board 43 and the scale 24 for example. Such a tilt leads to a varying coupling along the receive coil 35, because the distance between the receive coil 35 and the scale 24 is not constant in the measuring direction M. FIG. 6 shows a linear tilt with a tilting angle α as an example of a misalignment. A linear tilt or other misalignments can cause offsets in the receive signal detected in the receive circuit 34 and thus errors can occur in the determination of the position.

Figure 12:
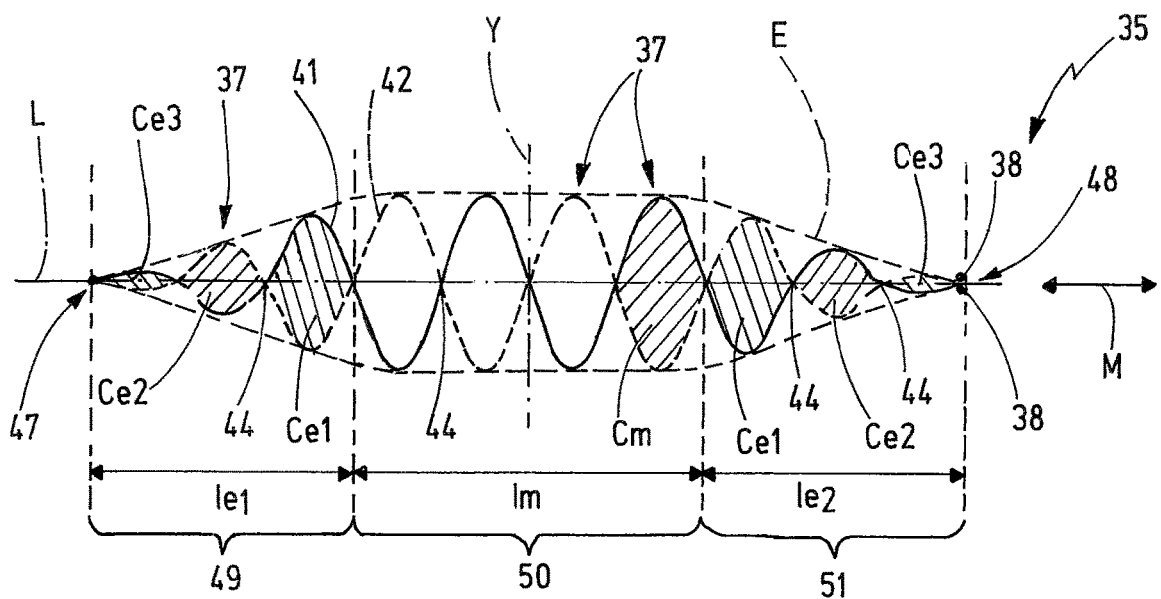
FIG. 12 is a schematic illustration of an embodiment with one receive coil.

Referring to FIG. 12, one embodiment of the receive coil 35 is shown. The receive coil 35 extends in measuring direction M between a first end 47 and a second end 48. At the first end 47 a short circuit connection between the two conductors 41 and 42 is provided. At the second end 48 the terminals 38 are provided.

In the preferred embodiment the first conductor 41 has a sinusoidal run starting from the first end 47. The second conductor 42 has a run that is obtained by mirroring the first conductor 41 at the longitudinal axis L. One half wave created by one conductor 41 or 42 or by adjacent conductor portions 41a, 42a on one side of the longitudinal axis L and a corresponding half wave created by one conductor 42 or 41 or by adjacent conductor portions 42a, 41a on the other side of the longitudinal axis L extend between two directly adjacent crossing locations 44 and define one loop 37 of the receive coil 35. Each loop 37 surrounds a loop area $C_m$, $C_{e1}$, $C_{e2}$.

As shown in FIG. 12, the receive coil 35 has a first end section 49 beginning at the first end 47, a middle section 50 directly adjacent to the first end section 49 and a second end section 51 directly adjacent to the middle section 50 and ending at the second end 48. Accordingly the middle section 50 connects the two end sections 49, 51. In each of these sections 49, 50, 51 at least one loop 37 is arranged. Preferably each of the end sections 49, 51 contains at least two loops 37 of the at least one receive coil 35.

The loop area amount of a loop 37 contained in the middle section 50 is referred to as middle section loop area amount $C_m$. The loop area amount of a loop 37 contained in the first end section 50 is referred to as end section loop area amount $C_{ei}$, wherein the Index i distinguishes unequal end section loop area amounts from each other. In the exemplary embodiment of FIG. 12, the Index i=1, 2 or 3.

The middle section loop area amount $C_m$ is larger than the end section loop area amount $C_{e1}$, $C_{e2}$, $C_{e3}$ in the end sections 49, 51.

In the preferred embodiment the middle section loop area amount $C_m$ of all of the loops 37 in the middle section 50 is equal. If in the end sections 49 and 51 respectively more than one loop 37 is arranged (as in the embodiment of FIG. 12), the end section loop area amount $C_{e1}$, $C_{e2}$, $C_{e3}$ decreases from the loop 37 next to the middle section 50 toward the first end 47 and the second end 48 respectively.

Each loop 37 contained in the first end section 49 has a counterpart loop 37 arranged in the second end section 51. The loop and its counterpart loop have the same loop end section area amount $C_{e1}$, $C_{e2}$, $C_{e3}$ and/or the same shape.

An envelope E surrounds the receive coil 35. The envelope E touches each of the loops 37 at its two opposite locations, preferably at each apex. The envelope E defines a height of the receive coil 35 in height direction H. The height increases from the first end 47 in the first end section 49 toward the middle section 50. Similarly the height increases from the second end 48 in the second end section 51 toward the middle section 50. The envelope E is defined by a respective envelope function A(x).

The total length of the receive coil 35 between the two opposite ends 47, 48 is indicated as coil lengths lc. The coil length lc corresponds to the sum of the length $le_1$ of the first end section, the length lm of the middle section 50 and the length $le_2$ of the second end section 51. The length $le_1$, $le_2$ of the two end sections 49, 51 is identical. The length lm of the middle section 50 may correspond to the length $le_1$, $le_2$ of the end sections 49, 51 or may be different.

The shape of the receive coil 35 is preferably symmetrical with regard to a height axis Y that extends in the height direction H.

Figure 13:
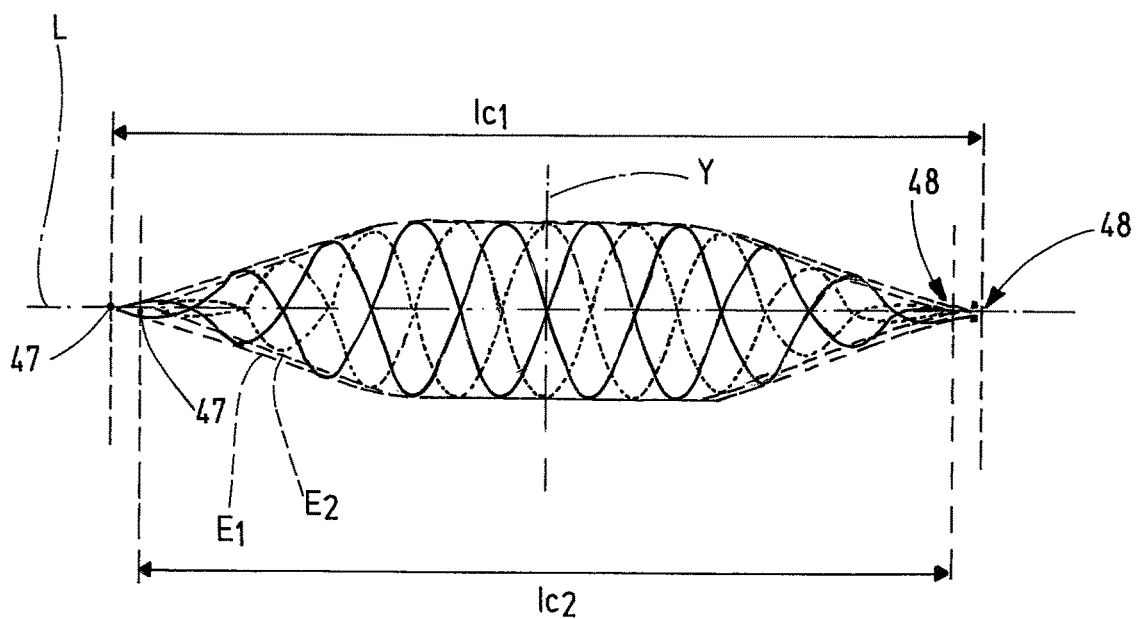

In an alternative embodiment one receive circuit 34 can contain more than one receive coil 35. FIG. 13 shows schematically an arrangement of two separate receive coils 35 on a circuit board 43. Both receive coils 35 are arranged symmetrically to the same height axis Y. The first ends 47 and the second ends 48 of the two receive coils 35 are offset in the measuring direction M. This simplifies providing vias at the first ends 47 and second ends 48 respectively for either short-circuiting the respective conductors 41, 42 at the first end 47 or for providing the terminals 38, that usually requires at least one via at the second end 48. The offset of the respective ends can be achieved by different coil lengths $lc_1$ and $lc_2$ and/or by different envelopes E1 and E2 of the two receive coils 35 respectively, as schematically illustrated in FIG. 13.

The lengths of the end section $le_1$ and $le_2$ respectively and/or the length lm of the middle section 50 correspond preferably to an integer multiple of the wave-length w.

Figure 7:
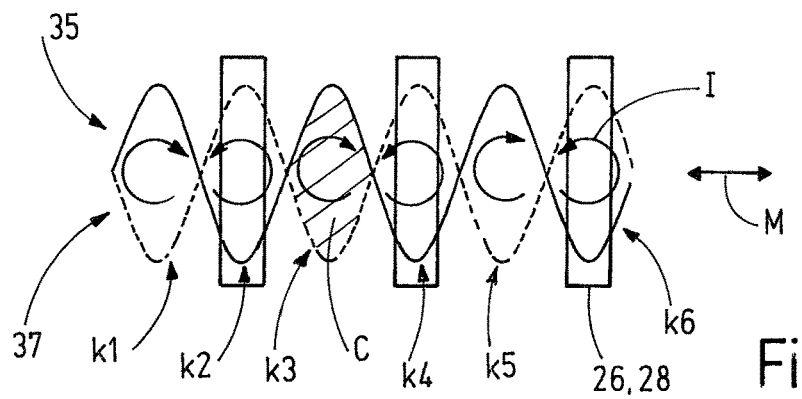
FIG. 7 is a schematic illustration of a receive coil according to the prior art and scale elements.
Figure 8:
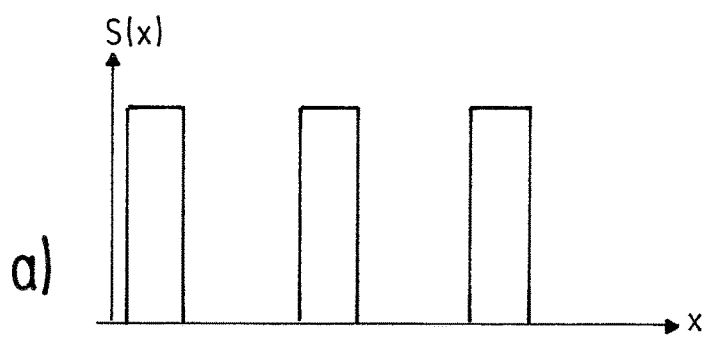
FIG. 8 shows different signals obtained by moving at least one receive coil of FIG. 7 along the scale.
Figure 8:
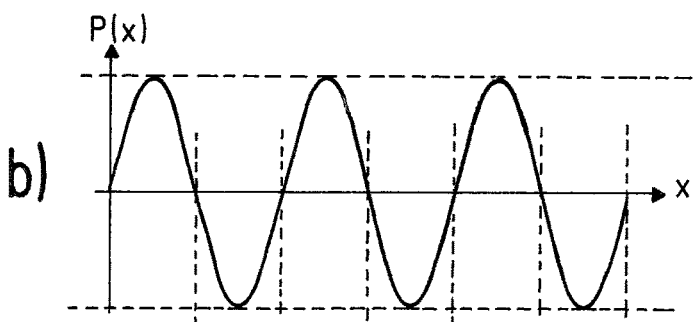
Figure 8:
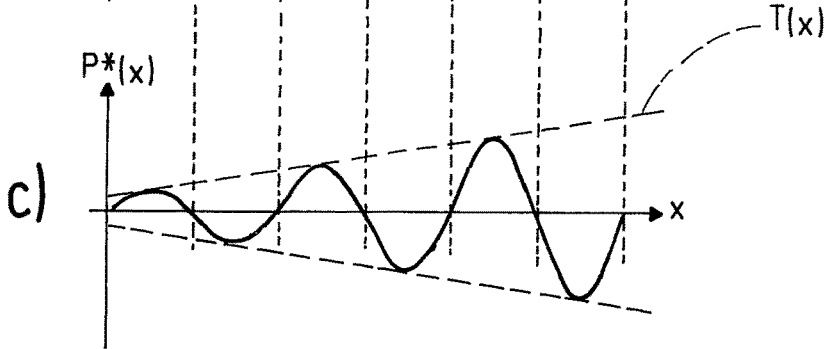
Figure 8:
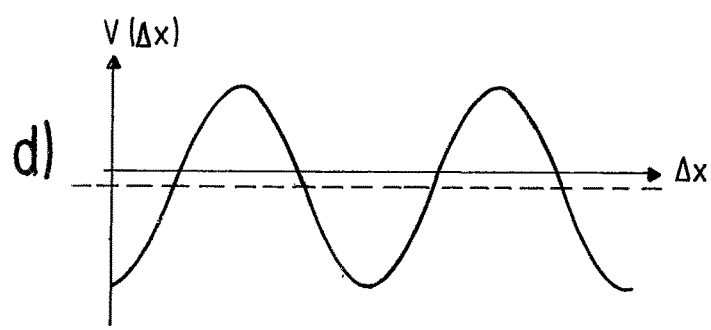

With regard to FIGS. 7 and 8 the influence of a linear tilt with regard to prior art inductive sensor devices is explained. As shown in FIG. 7, all of the loops 37 of the receive coil 35 have the same shape and thus the same loop area amount C.

In FIG. 8 the x axis extends in the measuring direction. FIG. 8a illustrates a simplified schematic field pattern S(x) that is created due to the coupling of the scale elements 26 with the magnetic field B created by the transmit coil 33. The field pattern S(x) is periodic with a pitch p.

In FIG. 8b a sensitivity pattern P(x) of the prior art receive coil 35 shown in FIG. 7 is illustrated. As shown in FIG. 7, a current I flows through one loop clockwise and through the one or two directly adjacent loops counter-clockwise. Accordingly, the sensitivity pattern P(x) has a sinusoidal form:

$$P(x)=\sin(2\pi\kappa x)A(x) \quad (1)$$

The spatial frequency κ is given by κ=1/p. The envelope of the prior art receive coil 35 corresponds to a rectangular window. It is described by a function A(x) which is constant over the length of the coil and zero outside the length of the coil. Thus the sensitivity pattern P(x) has a constant amplitude.

In the absence of any tilt, the total coupling between the field and the receive coil 35, when the receive coil 35 is displaced by a distance Δx relative to the scale 24, is $$V(\Delta x)=\int_{-\infty}^{\infty}P(x)S(x+\Delta x)dx \quad (2)$$

Because S(x) is a periodic function of x with period p, the same is true of V(Δx). V(Δx) also has no offset: the average value of V(Δx), $\langle V \rangle$, is the product of the average value of P(x), $\langle P \rangle$ and the average value of S(x), $\langle S \rangle$, the former of which is zero. That is, $$\langle V \rangle = \langle P \rangle \langle S \rangle \text{ so } \langle P \rangle = 0 \Rightarrow \langle V \rangle = 0. \quad (3)$$

FIG. 8c illustrates in dashed lines a tilt weighting function T(x). This describes how the coupling between the field and the coil is modified by tilt. The effect of a linear tilt can be described by:

$$T(x)=T_0+T_1 x \quad (4)$$

The coupling at a relative displacement or relative position of Δx between the sensor unit 25 and the scale 24 is modified by tilt as follows:

$$V(\Delta x)=\int_{-\infty}^{\infty}P(x)T(x)S(x+\Delta x)dx \quad (5)$$

The tilt effectively modifies the sensitivity function of the receive coil 35 to P*(x)=P(x)T(x) so that $$V(\Delta x)=\int_{-\infty}^{\infty}P^*(x)S(x+\Delta x)dx \quad (6)$$

The function P*(x) is illustrated in FIG. 8c. As shown in FIG. 8d, the coupling function V(Δx) is still periodic with period p, but it now has a non-zero offset. This offset would lead to errors in the calculation of the relative position Δx. As described by equation (3), the offset occurs because the average value of P*(x) is non-zero. As can be seen in FIG. 8c, the average value of P*(x) in this case is negative: the three positive half cycles of P*(x) are smaller than the three respective negative half cycles that follow them.

In addition to the average value of P*(x) there are two other ways to diagnose the effect of tilt.

Firstly, the maximum and minimum values of V(Δx) can be compared. As shown in FIG. 7 the peak coupling of each loop of the receive coil to the scale is given by numbers k1, k2, ..., k6. In the absence of tilts, these peak couplings are all equal, say equal to 1. The loops of the receive coil 35 have alternating positive (clockwise) and negative (anti-clockwise) orientations, and this determines whether the loops contribute positively or negatively to the total coupling. When the coil is in the position shown in FIG. 7, the total coupling reaches its minimum value, of $$V(\Delta x)=k2\cdot(-1)+k4\cdot(-1)+k6\cdot(-1)=-3 \quad (7)$$

When the coil is moved by half a pitch, the total coupling reaches its maximum value, of $$V(\Delta x)=k1\cdot(+1)+k3\cdot(+1)+k5\cdot(+1)=3 \quad (8)$$

The fact that the maximum and minimum total couplings are equal and opposite is evidence of zero offset.

In the presence of linear tilt, the peak couplings of each loop might be modified to, e.g.

k1=0.5
k2=0.7
k3=0.9
k4=1.1
k5=1.3
k6=1.5

When the coil is in the position shown in FIG. 7, the total coupling reaches its minimum value, of $$V(\Delta x)=k2\cdot(-1)+k4\cdot(-1)+k6\cdot(-1)=-3.3 \quad (9)$$

When the coil is moved by half a pitch, the total coupling reaches its maximum value, of $$V(\Delta x)=k1\cdot(+1)+k3\cdot(+1)+k5\cdot(+1)=2.7 \quad (10)$$

The fact that the maximum and minimum total couplings are not equal and opposite is evidence of non-zero offset.

Secondly, the offset can be diagnosed in terms of the Fourier transform of the sensitivity function P(x):

$$\mathcal{F}P(k)=\int_{-\infty}^{\infty}P(x)\exp(-2\pi ikx)dx \quad (11)$$

We can similarly define the Fourier transform of the field pattern, $\mathcal{F}S(k)$, and the Fourier transform of the coupling, $\mathcal{F}V(k)$. (Because S(x) and V(x) are periodic functions, $\mathcal{F}S(k)$ and $\mathcal{F}V(k)$ can be understood as discrete Fourier transforms or distributions.) The average value of a function is just the DC component of its Fourier transform, so the analogue of equation (3) is $$\mathcal{F}V(0)=\mathcal{F}P(0)\mathcal{F}S(0) \text{ so } \mathcal{F}P(0)=0 \Rightarrow \mathcal{F}V(0)=0. \quad (12)$$

FIG. 15a shows a rectangular envelope A(x) without tilt, P(x) and $\mathcal{F}P(k)$ for the receive coil with the rectangular envelope A(x). The Fourier transform $\mathcal{F}P(k)$ resembles a sinc function, centred at k=κ. It does satisfy $\mathcal{F}P(0)=0$, as required for V(x) to have no offset. FIG. 15b shows these functions when modified by a linear tilt. Using the form of T(x) in equation (4) and the properties of the Fourier transform we can write $$\mathcal{F}P^* = \mathcal{F}[T(x)P(x)] \quad (13)$$
$$= \mathcal{F}[T_0 P(x) + T_1 x P(x)]$$
$$= T_0 \mathcal{F}[P(x)] + T_1 \mathcal{F}[xP(x)]$$
$$= T_0 \mathcal{F}P(k) + T_1 \frac{d}{dk}[\mathcal{F}P(k)]$$

Using $\mathcal{F}P(0)=0$ this gives $$\mathcal{F}P^*(0) = T_1 \frac{d}{dk}[\mathcal{F}P(k)]_{k=0} \quad (14)$$

The term on the right is the slope of $\mathcal{F}P(k)$ at k=0. As can be seen in FIG. 15a this is not zero. Hence, as can be seen in FIG. 15b, $\mathcal{F}P^*(0)$ is not zero. As a result, V(Δx) has an offset.

Figure 15:
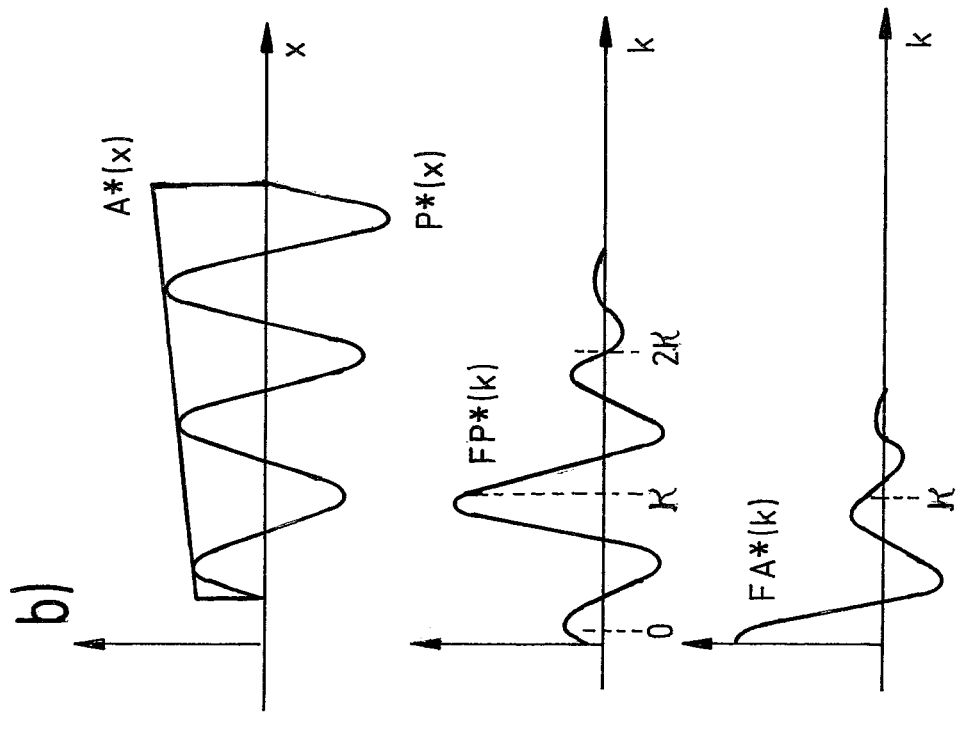
Figure 15:
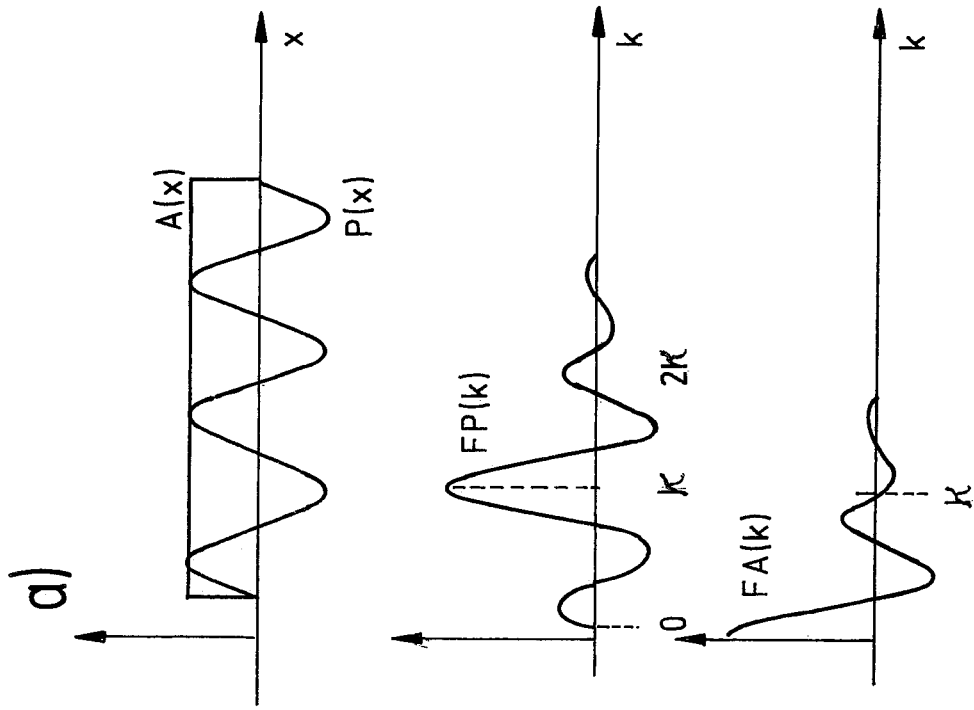

When the sensitivity function P(x) can be expressed as a product of a sinusoid, sin(2πκx), and an envelope function, A(x), a similar criterion can be placed on $\mathcal{F}A(k)$—since it is difficult to formulate a criterion directly for A(x). As shown in FIG. 15, $\mathcal{F}A(k)$ resembles $\mathcal{F}P(k)$ centred on k=0 instead of k=κ. For V(Δx) to not have an offset, it is necessary that $\mathcal{F}A(K)=0$. Again, for the sensitivity function with a rectangular envelope, this criterion fails when the function is modified by a linear tilt, i.e. $\mathcal{F}A^*(K)\neq 0$.

It is an objective of the invention to create shapes for the receive coil which do not result in an offset in the presence of tilt. Further, it is an objective to create shapes for the receive coil which are insensitive to a range of tilts and misalignments. For example, the tilt weighting function T(x) can be described as Taylor series in the following form:

$$T(x)=T_0+T_1 x+T_2 x^2+T_3 x^3+\ldots \quad (15)$$

$T_i$ with i=1, 2, 3 . . . , are tilting coefficients by means of which the misalignment can be described, e.g. the misalignment of the sensor unit 25 and the scale 24. Mathematically speaking, the objective is to find a sensitivity function P(x) such that the average value of $P^*(x)=P(x)T(x)$ is zero—or sufficiently close to zero so that an offset does not exceed a predefined threshold offset amount—for a range of functions T(x). Based on equation (15), it is sufficient for the average value of $P(x)x^i$ to be zero, or sufficiently close to zero, for a number of values of i.

Figure 9:
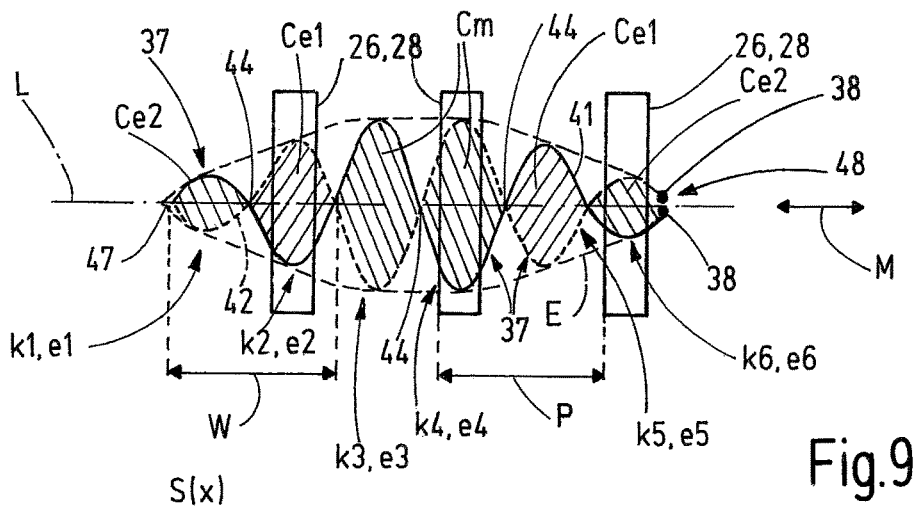
FIG. 9 illustrates the basic principle of a receive coil according to the invention and scale elements.
Figure 10:
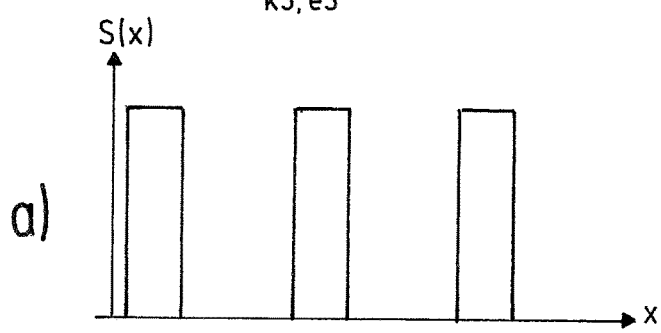
FIG. 10 shows signals obtained because of the by moving at least one receive coil of FIG. 9 along the scale.
Figure 10:
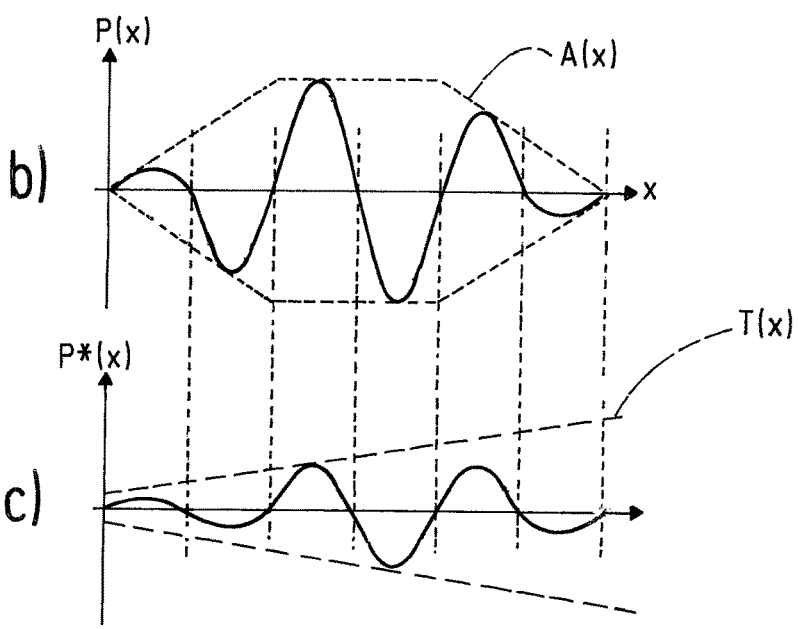
Figure 10:
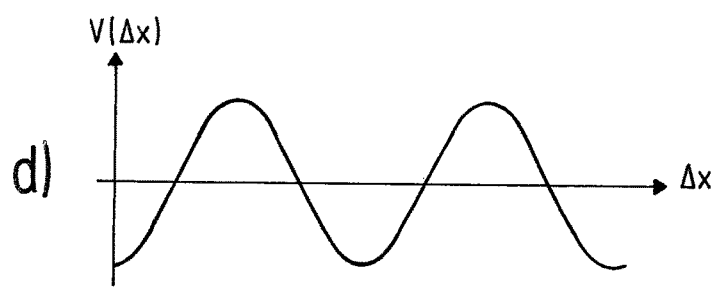

FIGS. 9 and 10 show the operation of the inductive sensor device 23 according to the present invention. FIG. 9 shows the inventive shape of the receive coil 35 having in this example two loops 37 in the middle section 50 and two loops 37 in each of the end sections 49 and 51, one having a first end section loop area amount $C_{e1}$, and the other having a second end section loop area amount $C_{e2}$. FIG. 10a corresponds to the field pattern S(x) of FIG. 8a. The sensitivity pattern P(x) shown in FIG. 10b provides different weightings to the loops dependent from whether they are arranged in the middle section 50 or in one of the end sections 49, 51. This can also be described by means of a window function A(x) that characterizes the envelope E of the receive coil 35. FIG. 10c shows the modified sensitivity pattern $P^*(x)$ due to the tilt weighting function T(x). The sensitivity pattern P(x) of the inventive receive coil 35 has the property that the average value of $P^*(x)=P(x)T(x)$ is zero for a range of tilt weighting functions. As a result, the tilt in the measuring direction M (x-direction) does not cause any offset in the total coupling V(Δx) between the sensor unit 25 and the scale 24.

The insensitivity of this receive coil shape to different forms of tilt can be explained using the two mathematical methods used for the prior art coil.

Firstly, the maximum and minimum values of the total coupling can be compared. In the example used with regard to the prior art arrangement (FIGS. 7 and 8) the weighting factors k1 to k6 describe a linear tilt in measuring direction M of the loops 37. In this example each end section 49, 51 contains one loop 37 having the first end section loop area amount $C_{e1}$ and a further loop 37 having the second end section loop area amount $C_{e2}$ both smaller than the middle section loop area amount $C_m$. Accordingly a weighting factor e can be applied to each loop depending on its loop area amount:

e1=e6=0.25
e2=e5=0.75
e3=e4=1.0

The total coupling in the position of the receive coil 35 as shown in FIG. 9 corresponds to:

$$V(\Delta x)=k2\cdot e2\cdot(-1)+k4\cdot e4\cdot(-1)+k6\cdot e6\cdot(-1)=-2.0 \quad (16)$$

The total coupling in a position where the receive coil 35 is moved with a half wavelength w in the measuring direction M, the total coupling is as follows:

$$V(\Delta x)=k1\cdot e1\cdot(+1)+k3\cdot e3\cdot(+1)+k5\cdot e5\cdot(+1)=2.0 \quad (17)$$

As can be seen, the total coupling of the equations (16) and (17) is equal and opposite and accordingly no offset is created. The coupling factors k1 . . . k6 correspond to a particular amount of linear tilt but, analogous to equation (15), a more general form of tilt can be considered:

$k1 = 1 + T_1(-0.5) + T_2(-0.5)^2 + T_3(-0.5)^3 + \ldots$ $k2 = 1 + T_1(-0.3) + T_2(-0.3)^2 + T_3(-0.3)^3 + \ldots$ $k3 = 1 + T_1(-0.1) + T_2(-0.1)^2 + T_3(-0.1)^3 + \ldots$ $k4 = 1 + T_1(0.1) + T_2(0.1)^2 + T_3(0.1)^3 + \ldots$ $k5 = 1 + T_1(0.3) + T_2(0.3)^2 + T_3(0.3)^3 + \ldots$ $k6 = 1 + T_1(0.5) + T_2(0.5)^2 + T_3(0.5)^3 + \ldots$ The original example of linear tilt corresponds to $T_1=1$, $T_2=0$, $T_3=0$, . . . . It can be checked that equations (16) and (17) give equal and opposite total couplings for any value of $T_1$ when the other coefficients are zero. This holds when the loop weighting factors satisfy $3e2-5e1=1$. The symmetry of the loop weighting factors along the measurement direction (e1=e6, e2=e5, e3=e4) means that the total couplings in (16) and (17) are equal and opposite for any values of the even coefficients $T_2, T_4, \ldots$. In order that equations (16) and (17) give equal and opposite total couplings for any value of $T_3$, it is sufficient that $3^3 e2 - 5^3 e1 = 1$. The two criteria for $T_1$ and $T_3$ comprise two linear equations in the loop weightings e1 and e2, with the solution e1=⅓, e2=⅝. In other words, the following loop weightings provide insensitivity to symmetric tilt weighting functions and linear and cubic tilt weighting functions:

e1=e6=⅓
e2=e5=⅝
e3=e4=1.0

With this design principle of the receive coil 35 it is also possible to compensate for a larger range of tilts and misalignments. The number of loops 37 having different loop area amounts in one end section 49, 51 corresponds at least to the number of tilting coefficients $T_i \neq 0$ in the given tilt weighting function T(x) that can be compensated for. For many applications it is sufficient to compensate for linear tilts.

Figure 11:
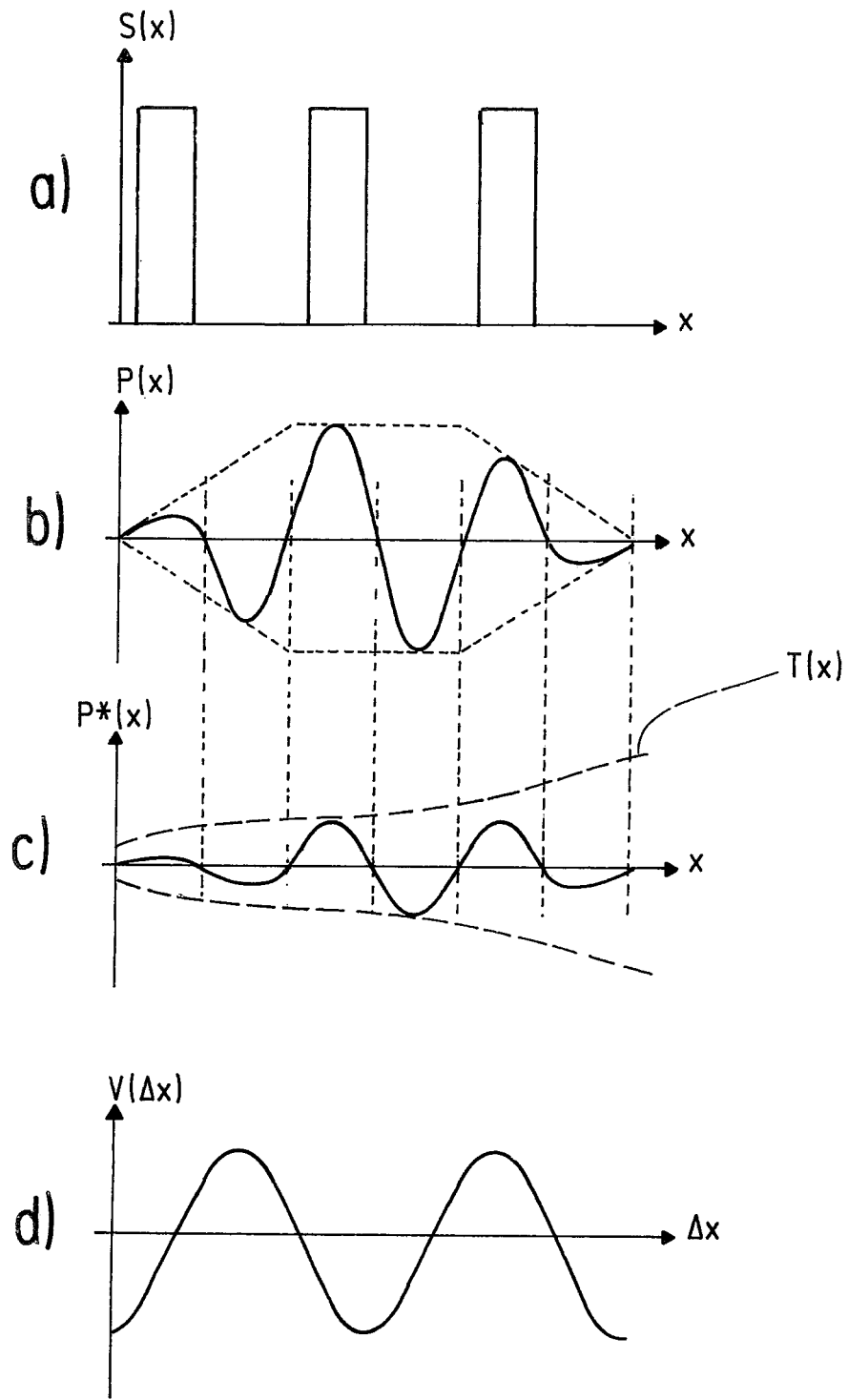
FIG. 11 shows similar signals as FIG. 10, wherein the tilt weighting function shown in FIG. 11c is different from the tilt weighting function shown in FIG. 10c.

As shown in FIG. 11, the invention can be used to compensate for tilt weighting function T(x) that are non-linear and have powers of x higher than 1. Apart from the tilt function in FIG. 11c the illustration in FIGS. 11a, 11b and 11d corresponds to the illustration in FIGS. 10a, 10b and 10d, so that reference can be made to the explanation of FIGS. 9 and 10 above.

The second mathematical method can be used to explain the insensitivity of the receive coil shapes to a range of tilt functions. Using the more general form of T(x) in equation (15) in equation (13) gives $$\mathcal{F} P^*(k) = \mathcal{F}[T(x)P(x)] \qquad (18)$$

$$= T_0 \mathcal{F} P(k) + T_1 \frac{d}{dk}[\mathcal{F} P(k)] +$$

$$T_2 \frac{d^2}{dk^2}[\mathcal{F} P(k)] + T_3 \frac{d^3}{dk^3}[\mathcal{F} P(k)] + \ldots$$

As described by equation (12), to provide insensitivity to a range of tilts and misalignments, it is necessary that $\mathcal{F} P^*(0) = 0$ for a range of functions T(x). From equation (18), it is sufficient for the slope (first derivative) and some higher order derivatives of $\mathcal{F} P(k)$ to be zero (or nearly zero) at k=0. It is also advantageous for the these derivatives to be zero (or nearly zero) at k=2κ: this avoids other forms of distortion of the coupling function V(Δx) and therefore other types of position-dependent error.

FIG. 16a shows the Fourier transform $\mathcal{F} P(k)$ of the sensitivity function of the receive coil in FIG. 9. It decays to zero (or nearly zero) as k approaches 0 and 2κ. As shown in FIG. 16b, when the sensitivity function is modified by tilt (envelope function A*(x) corresponds to the envelope function A(x) that is distorted due to tilt), the modified Fourier transform $\mathcal{F} P^*(k)$ is distorted but still has the same property that it decays to zero (or near zero) as k approaches 0 and 2κ. For a sensitivity function expressed as a product of a sinusoid, sin(2πκx), and an envelope function, A(x), the corresponding criterion on $\mathcal{F} A(k)$ is that it decays to zero (or nearly zero) as k approaches κ.

In the present embodiments the loops 37 of the at least one receive coil 35 are formed by sine and cosine half-waves of the two conductors 41, 42. However, the invention can also be used with other shapes of loops 37.

In the end sections the envelope A(x) can decrease linearly. However, other forms of envelope end section shapes can characterize the decreasing height of the receive coil 35 and/or the decreasing loop area amounts in the respective end section toward the respective first or second end 47, 48.

It has been recognized that it is advantageous to provide a length $le_1$ and $le_2$ of the two end sections 49, 51 that at least corresponds to one wavelength w, which means that each end section 49, 51 contains at least two loops 37.

The coil design of the present invention is simple and easy to implement on the printed circuit board 43. Each receive coil 35 and/or each of the conductors 41, 42 has a continuous run between the two ends 47, 48 of the receive coil 35 without any disruptions or gaps in measurement direction M. The design can also be used for implementing two, three or more receive coils 35 in each receive circuit 34.

Figure 14:
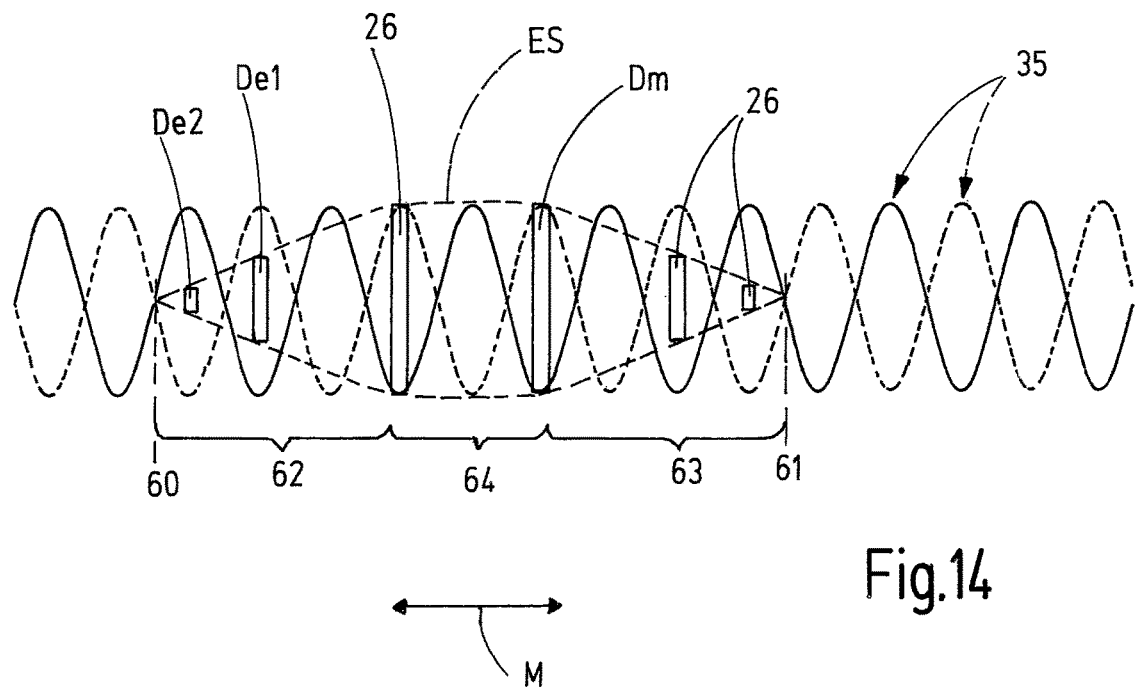
FIG. 13 is a schematic illustration of another embodiment with two receive coils that form part of the same receive circuit and FIG. 14 is schematic illustration of another embodiment of the invention showing a long receive coil and a shorter scale where the scale elements instead of the receive coil loops are positioned in a tapered envelope, FIG. 15a) shows a sensitivity function P(x), an envelope function A(x) and their Fourier transforms for a receive coil with a rectangular envelope and no tilt, FIG. 15b) shows how the functions of FIG. 15a) modified by a linear tilt, and FIG. 16a) and b) show functions corresponding to the functions of FIGS. 15a) and b) respectively for a receive coil with a tapered envelope.

FIG. 14 shows an alternative embodiment of the present invention. A long receive coil 35 is provided that extends along the measuring distance in measuring direction M. The scale elements 26 extend over a smaller range in measuring direction M and are surrounded by a scale envelope ES. Similar to the envelope E of the receive coil as described above, the scale envelope ES extends between a first end 60 and a second end 61 and has directly adjacent to the first end 60 a first end section 62 and directly adjacent to the second end 61 a second end section 63. A middle section 64 is positioned between the two end sections 62, 63. In each of the end sections 62, 63 at least two scale elements 26 are provided that have scale element area amounts $D_{ci}$ that decrease from scale element to scale element toward the respective first or second end 60, 61. In the middle section 64 of the scale element ES at least two scale elements 26 are provided that have equal scale element area amounts $D_m$. The function of this embodiment of the invention corresponds to the function as described above with regard to the FIGS. 1-13. Depending whether the scale or the receive coil is longer in measuring direction M and extends over the full measuring range, the respective other member having a shorter dimension in measuring direction M is designed with the tapered envelope and decreasing area amounts toward the opposite ends in measuring direction.

The envelope E of the inventive receive coil 35 or the scale envelope ES can be described easily by defining a respective window function A(x). This allows simple performance diagnostics.

The invention can be used to mitigate or compensate any desired misalignment, not only linear tilts.

The present invention provides an inductive sensor device 23 having a scale 24 with a number of scale elements 26 that provide a field pattern S(x) in at least one line 27 extending in a measuring direction M. The inductive sensor device 23 at least one receive circuit 34 with at least one receive coil 35. The receive coil 35 and the scale 24 are moveable relative to each other in measuring direction M. The at least one receive coil 35 extends from a first end 47 to a second end 48 in measuring direction M. It has a first end section 49 directly adjacent to the first end 47 and a second end section 51 directly adjacent to the second end 48. Between the two end sections 49, 51 a middle section 50 is provided. Each of the sections 49, 50, 51 contains at least one and preferably at least two loops 37 of the receive coil 35. In both of the end sections 49, 51 the loop area amount of the loops 37 decreases from loop to loop in direction from the loop 37 next to the middle section 50 toward the respective end 47 or 48. Such a loop design provides mitigation or compensation of misalignments between the receive coil 35 and the scale 24.

Parts List:
20 measuring instrument
21 inside jaws
22 outside jaws
23 inductive sensor device
24 scale
25 sensor unit
26 scale elements
27 line of scale elements
28 scale loop
32 transmit circuit
33 transmit coil
34 receive circuit
35 receive coil
36 voltage source
37 loop of receive coil
41 first conductor
42 second conductor
43 circuit board
43a layer of the circuit board
43b layer of the circuit board
44 crossing location
47 first end of the receive coil
48 second end of the receive coil
49 first end section
50 middle section
51 second end section
60 first end of the scale envelope
61 second end of the scale envelope
62 first end section of the scale envelope
63 second end section of the scale envelope
64 middle section of the scale envelope
α a tilting angle
$C_{ei}$ end section loop area amount of the receive coil (i=1, 2, 3, ...)
$C_m$ middle section loop area amount of the receive coil
$D_{ei}$ end section area amount of the scale elements in the end section of the scale envelope (i=1, 2, 3, ...)
$D_m$ middle section area amount of the scale elements in the middle section of the scale envelope
$E_i$ envelope (i=1, 2, 3, ...) of the receive coil
ES scale envelope of the scale elements
$e_i$ weighting factor due to envelope (i=1, 2, 3, ...)
$k_i$ tilting factor due to tilt (i=1, 2, 3, ...)
L longitudinal axis
lc coil length
$le_1$ lenth of the first end section
$le_2$ lenth of the second end section
lm lenth of the middle section
M measuring direction
p scale pitch
P(x) sensitivity pattern
P*(x) modified sensitivity pattern
S(x) field pattern
$T_i$ tilting coefficient (i=1, 2, 3, ...)
Vr receive voltage
V(Δx) total coupling depending from relative position
x variable in measuring direction
Δx relative position of receive coil and field pattern along x-axis
Y height axis

The invention claimed is:

1. An inductive sensor device (23) comprising:
a scale (24) having at least one line (27) of a plurality of scale elements (26) extending in a measuring direction (M) that are adapted to create a field pattern (S(x)) along the at least one line (27) in the measuring direction (M),
a sensor unit (25), wherein the sensor unit (25) and the scale (24) are moveable relative to each other in the measuring direction (M),
wherein the sensor unit (25) comprises at least one receive circuit (34) with at least one receive coil (35) that is adapted to detect the field pattern (S(x)),
wherein each of the at least one receive coil (35) contains a plurality of loops (37) that are arranged adjacent to each other in the measuring direction (M), wherein each of the plurality of loops (37) encloses a loop area ($C_m$, $C_{ei}$),
wherein the at least one receive coil (35) extends between a first end (47) and a second end (48) in the measuring direction (M) and has a coil length (lc) in the measuring direction (M) between the first end (47) and the second end (48) that is shorter than a length of the at least one line (27) of the plurality of scale elements (26),
wherein the at least one receive coil (35) has a first end section (49) directly adjacent to the first end (47), a second end section (51) directly adjacent to the second end (48), and a middle section (50) between the first and second end sections (49, 51),
wherein at least one loop of the plurality of loops is located in each of the first and second end sections and the middle section, wherein a size of the loop area ($C_{ei}$) of at least one loop (37) arranged in each of the first and second end sections (49, 51) is smaller than a size of the loop area ($C_m$) of at least one loop (37) arranged in the middle section (50), thereby providing a sensitivity pattern (P(x)) of the at least one receive coil (35) with different weightings to the plurality of loops (37),
wherein the product of the sensitivity pattern (P(x)) of the at least one receive coil (35) and each of a plurality of tilt weighting functions (T(x)) has an average value of zero, wherein each of the plurality of tilt weighting functions (T(x)) describe a tilt and/or misalignment between the sensor unit (25) and the scale (24) in the measuring direction (M).

2. The inductive sensor device according to claim 1, wherein the at least one receive coil (35) has at least two loops (37) of the plurality of loops in each of the first and second end sections (49, 51).

3. The inductive sensor device according to claim 2, wherein the size of the loop area ($C_{ei}$) of each of the at least two loops in each of the first and second end sections decreases from loop (37) to loop (37) toward the first end (47) in the first end section (49) and toward the second end (48) in the second end section (51).

4. The inductive sensor device according to claim 1, further comprising a transmit circuit (32) with at least one transmit coil (33) adapted to create a magnetic field (B), wherein the scale elements (26) are passive field influencing elements provided to influence the magnetic field (B) of the transmit coil (32) to create the field pattern (S(x)).

5. The inductive sensor device according to claim 4, wherein the transmit circuit (32) is part of the sensor unit (25).

6. The inductive sensor device according to claim 4, wherein the at least one transmit coil (33) surrounds the at least one receive coil (35) of the at least one receive circuit (34).

7. The inductive sensor device according to claim 1, wherein a plurality of the plurality of loops (37) are arranged in the middle section (50) of the receive coil (35) and each of the plurality of loops in the middle section have equal loop area sizes ($C_m$).

8. The inductive sensor device according to claim 1, wherein the at least one receive coil (35) has a coil height perpendicular to the measuring direction (M), wherein the coil height increases in the first end section (49) from the first end (47) toward the middle section (50) and wherein the coil height decreases in the second end section (51) from the middle section (50) toward the second end (48).

9. The inductive sensor device according to claim 8, wherein the coil height and the coil length (lc) are defined by an envelope (E) surrounding the at least one receive coil.

10. The inductive sensor device according claim 8, wherein the at least one receive circuit (34) contains at least two receive coils (35) having at least one of different coil lengths ($lc_1$, $lc_2$) and different envelopes (E1, E2) which respectively surround the at least two receive coils.

11. The inductive sensor device according to claim 1, wherein a peak coupling (ki) of each of the plurality of loops (37) of the at least one receive coil (35) is given depending on their relative orientation and wherein a weighting factor (ei) is applied to each of the plurality of loops (37) representing its loop area size ($C_m$, $C_{ei}$), and wherein the loop area sizes ($C_m$, $C_{ei}$) are defined so that the total coupling (V(Δx)) of the field pattern (S(x)) and the at least one receive coil (35) has equal and opposite amounts at a first relative position with a minimum total coupling (V(Δx)) and a second relative position with a maximum total coupling (V(Δx)).

12. The inductive sensor device according to claim 1, wherein a coil height and the coil length (lc) are defined by an envelope (E) surrounding the at least one receive coil (35), wherein the envelope (E) is defined in a way that a Fourier Transform of a coupling function and at least one of its derivatives are zero at a zero wavenumber in a Fourier Domain.

13. The inductive sensor device according to claim 1, wherein each of the plurality of loops (37) of the at least one receive coil (35) has a symmetrical shape with regard to a longitudinal axis (L) extending in the measuring direction (M).

14. The inductive sensor device according to claim 1, wherein at least one of an end section length ($le_1$, $le_2$) of the end sections (49, 51 and a middle section length (lm) of the middle section (50) in the measuring direction (M) corresponds to an integer multiple of a dimension of the loop (37) at a longitudinal axis (L) extending in the measuring direction (M).

15. The inductive sensor device according to claim 1, wherein the at least one receive coil (35) is defined by a first conductor (41) or portions (41a) of the first conductor (41) arranged in a layer (43a) of a circuit board and a second conductor (42) or portions (41a) of the second conductor (42) arranged in another layer (43b) of the circuit board (43).

16. The inductive sensor device according to claim 15, wherein a portion (41a) of the first conductor (41) and a portion (42a) of the second conductor (42) are alternately arranged so as to form loops (37) that have a sinusoidal shape on one side of a longitudinal axis (L) and a shape at the opposite side of the longitudinal axis (L) obtained by mirroring the sinusoidal shape on the one side of the longitudinal axis (L).

17. The inductive sensor device according to claim 1, wherein a plurality of the plurality of loops are arranged in the first end section, and each of the plurality of loops arranged in the first end section (49) has a counterpart loop arranged in the second end section (51) of the receive coil (35) having at least one of the same loop area size ($C_{ei}$) or the same shape.

18. An inductive sensor device (23) comprising:
a scale (24) having at least one line (27) of a plurality of scale elements (26) extending in a measuring direction (M) that are adapted to create a field pattern (S(x)) along the at least one line (27) in the measuring direction (M), wherein each scale element (26) encloses a scale element area ($D_m$, $D_{ei}$),
a sensor unit (25), wherein the sensor unit (25) and the scale (24) are moveable relative to each other in the measuring direction (M),
wherein the sensor unit (25) comprises at least one receive circuit (34) with at least one receive coil (35) that is adapted to detect the field pattern (S(x)), wherein the at least one receive coil (35) has a sensitivity pattern (P(x)),
wherein each of the at least one receive coil (35) contains loops (37) that are arranged adjacent to each other in the measuring direction (M), wherein a coil length (lc) in the measuring direction (M) between the first end (47) and the second end (48) of the at least one receive coil (35) is longer than a length of the at least one line (27) of the plurality of scale elements (26),
wherein the scale elements (26) are surrounded by a scale envelope (ES) extending between a first end (60) and a second end (61) in the measuring direction (M) and having a first end section (62) directly adjacent to the first end (60), a second end section (63) directly adjacent to the second end (61), and a middle section (64) between the two first and second end sections (62, 63),
and wherein at least one scale element of the scale elements is located in each of the first and second end sections and the middle section, wherein a size of a scale element area ($D_{ei}$) of the at least one scale element (26) arranged in each of the first and second end sections (62, 63) is smaller than a size of a scale element area ($D_m$) of the at least one scale element (26) arranged in the middle section (64), such that the field pattern (S(x)) has property that the product of an average value ((P)) of the sensitivity pattern (P(x)) of the at least one receive coil (35) and an average value (⟨S⟩) of the field pattern (S(x)) is zero for each of the plurality of tilt weighting functions (T(x)) describing a tilt and/or misalignment between the sensor unit (25) and the scale (24) in measuring direction (M).

19. The inductive sensor device according to claim 18, wherein at least two scale elements are arranged in each of the first and second end sections (62, 63) of the scale envelope (ES).

20. The inductive sensor device according to claim 19, wherein the size of the scale element area ($D_{ei}$) of each of the at least two scale elements decreases from scale element (26) to scale element (26) toward the first end (60) in the first end section (62) and toward the second end (61) in the second end section (63).

21. The inductive sensor device according to claim 18, wherein a plurality of scale elements of the scale elements (26) are arranged in the middle section (64) of the scale envelope (ES) and each have equal scale element area sizes ($D_m$).

22. The inductive sensor device according to claim 18, wherein a peak coupling (ki) of each of the scale elements (26) is given depending on their relative orientation and wherein a weighting factor (ei) is applied to each of the scale elements (26) representing its scale area size ($D_m$, $D_{ei}$), and wherein the scale area size is defined so that the total coupling (V(Δx)) of the field pattern (S(x)) and the at least one receive coil (35) has equal and opposite amounts at a first relative position with a minimum total coupling (V(Δx)) and a second relative position with a maximum total coupling (V(Δx)).

23. The inductive sensor device according to claim 18, wherein at least one of an end section length ($le_1$, $le_2$) of the end sections (62, 63) and a middle section length (lm) of the middle section (64) in the measuring direction (M) correspond to an integer multiple of a dimension of the scale element (26) at a longitudinal axis (L) extending in the measuring direction (M).

24. The inductive sensor device according to claim 18, wherein a plurality of scale elements of the scale elements (26) are arranged in the first end section (62) and each of the plurality of scale elements arranged in the first end section (62) of the scale envelope (ES) has a counterpart scale element (26) arranged in the second end section (63) of the scale envelope (ES) having at least one of the same scale element area size ($D_{ei}$) or same shape.

25. An inductive sensor device (23) comprising:
   a scale (24) having at least one line of a plurality of scale elements (26) extending in a measuring direction (M) that are adapted to create a field pattern (S(x)) along the at least one line (27) in the measuring direction (M),
   a sensor unit (25), wherein the sensor unit (25) and the scale (24) are moveable relative to each other in the measuring direction (M),
   wherein the sensor unit (25) comprises at least one receive circuit (34) with at least one receive coil (35) that is adapted to detect the field pattern (S(x)),
   wherein each of the at least one receive coil (35) contains a plurality of loops (37) that are arranged adjacent to each other in the measuring direction (M), wherein each of the plurality of loops (37) encloses a loop area ($C_m$, $C_{ei}$),
   wherein the at least one receive coil (35) extends between a first end (47) and a second end (48) in the measuring direction (M) and has a first end section (49) directly adjacent to the first end (47), a second end section (51) directly adjacent to the second end (48), and a middle section (50) between the first and second end sections (49, 51),
   wherein at least one loop of the plurality of loops is located in each of the first and second end sections and the middle section, wherein a size of the loop area ($C_{ei}$) of at least one loop (37) arranged in each of the first and second end sections (49, 51) is smaller than a size of the loop area ($C_m$) of at least one loop (37) arranged in the middle section (50), and
   wherein a peak coupling (ki) of each of the plurality of loops (37) of the at least one receive coil (35) is given depending on their relative orientation and wherein a weighting factor (ei) is applied to each of the plurality of loops (37) representing its loop area size ($C_m$, $C_{ei}$), and wherein the loop area sizes ($C_m$, $C_{ei}$) are defined so that the total coupling (V(Δx)) of the field pattern (S(x)) and the at least one receive coil (35) has equal and opposite amounts at a first relative position with a minimum total coupling (VΔx)) and a second relative position with a maximum total coupling (V(Δx)).

\* \* \* \* \*